United States Patent [19]

Larsson

[11] Patent Number: 4,752,680

[45] Date of Patent: Jun. 21, 1988

[54] TAGS FOR IDENTIFICATION SYSTEM

[75] Inventor: Bengt Larsson, Vallentuna, Sweden

[73] Assignee: Saab Automation AB, Linkoping, Sweden

[21] Appl. No.: 67,554

[22] Filed: Jun. 26, 1987

[30] Foreign Application Priority Data

Jan. 2, 1985 [SE] Sweden ............................ 8405845

[51] Int. Cl.$^4$ ............................................ G06K 19/06
[52] U.S. Cl. ..................................... 235/492; 235/451
[58] Field of Search ............................... 235/451, 492

[56] References Cited

U.S. PATENT DOCUMENTS 4,146,781 3/1979 Machata ............................. 235/492

Primary Examiner—Harold I. Pitts
Attorney, Agent, or Firm—James E. Nilles; James R. Custin

[57] ABSTRACT

The invention relates to a card-like information carrier readable with RF waves and having resonant devices at spaced intervals across its face that are tuned to different resonant frequencies, an item of information being encoded in the pattern of those frequencies. Each device comprises a dielectric sheet having a deposit of conductive material overlying each of its surfaces. At least one deposit has a spiral slit that defines in it a spiral inductance coil. Each deposit has a capacitance region opposing a like capacitance region of the other and having substantial extension in directions along and away from the slit. Each device can be returned to a predetermined higher resonant frequency by punching through the carrier to reduce areas of opposing capacitance regions of the device, or it can be made non-resonant by punching through all turns of its coil.

4 Claims, 2 Drawing Sheets

TAGS FOR IDENTIFICATION SYSTEM

FIELD OF THE INVENTION

This invention relates to information carriers such as cards, tags and labels that contain passive resonant devices tuned to different resonant frequencies and disposed in a predetermined pattern across the face of the carrier, such a carrier being adapted for use with a reader comprising a transmitter that emits radio frequency electromagnetic waves cooperating with sensor means responsive to the resonant frequency of each device for determining, from the pattern of frequencies of the devices, an identity signified by the carrier. The invention is more particularly concerned with a carrier having a plurality of resonant devices which can be in the form of printed circuits and each of which can be initially tuned to a predetermined resonant frequency and can be quickly, easily and accurately retuned to any selected one of several other predetermined frequencies.

BACKGROUND OF THE PRIOR ART

U.S. Pat. No. 3,521,280 discloses an information carrier of the general type to which the present invention relates and apparatus for reading it that operated at X-band frequencies. The carrier, in the form of a label, comprised a sheet of plastic overlain on one surface by a layer of electrically conductive material and on the other by small conducting strips that comprised resonant devices, each having a length equal to a quarter wave length of a predetermined frequency in the X-band. Such a carrier was suitable for situations where a large number of carriers bearing identical information were to be produced, but it was not suitable for inexpensive production where every carrier had to be encoded with information different from that on all of the others, or where only a few carriers at a time were encoded with identical information. Furthermore, the system provided for the encoding of only a relatively limited number of different items of information since the reader responded only to the presence or absence of predetermined frequencies without taking account of the sequence in which the resonant devices that were tuned to those frequencies were arranged across the face of the carrier.

U.S. Pat. No. 3,671,721 discloses a generally similar information carrier and reading apparatus with which it was used. The area of the carrier was divided into squares arranged in a pattern of columns and rows, and a resonant device was located in each of at least certain of the squares so that the information encoded on the carrier could be read by sensor means comprising a scanner. Each resonant device was in the form of a flat metallic spiral deposited on an insulating surface and comprising an inductive coil. The resonant devices were tuned to a limited number of different frequencies, and the information carrier was either produced by means of a mask depicting coils of the required frequencies or by making all coils initially of the same frequency and then entering data by removing parts or all of some of the coils to produce the required frequency distribution. Tuning such a resonant device by scraping away a portion of a coil was both troublesome and time consuming. Frequency adjustment by scraping tended to be somewhat inaccurate, and therefore it required that the resonant frequency of the adjusted device be checked after scraping. Of course the checking operation was likely to reveal the need for further adjustment, or even to reveal that the carrier had been spoiled by scraping away too much of a coil.

Swedish patent application No. 8404876-8 discloses a carrier generally like that last described but wherein each resonant device comprised a spiral coil of conductive material imprinted or otherwise deposited on one surface of an insulating sheet and a disc-like area of electrically conductive material on the opposite surface of that sheet that had about the same diameter as the coil and was substantially concentric with it. The disc-like deposit constituted a condenser plate that cooperated with the internal capacitance of the coil to provide the total capacitance of the device. As with the resonant device of U.S. Pat. No. 3,671,721, the resonant frequency of the device was retuned by scraping away a portion of the coil.

SUMMARY OF THE INVENTION

The general object of this invention is to provide an information carrier in the nature of a card, tag, label or the like having a plurality of resonant devices disposed in a predetermined pattern across its face and each initially tuned to a predetermined resonant frequency, each said resonant device being so arranged that it can be quickly, easily and accurately retuned to any selected one of a number of predetermined higher resonant frequencies, so that a large number of initially identical information carriers of this invention can be inexpensively mass produced and then each such carrier can be quickly and inexpensively modified to encode on it information that is distinctive to it.

Another object of the invention is to provide an inexpensive information carrier which achieves the above stated objective and upon which any selected one of an extraordinarily large number of different items of information can be encoded.

A more specific object of the invention is to provide an information carrier having a plurality of resonant devices thereon, each of which can be in the form of a printed circuit and each of which initially has a predetermined resonant frequency and can be quickly and accurately retuned to a predetermined higher resonant frequency or disabled to be effectively non-resonant, to provide for a further increase in the number of different items of information that can be encoded on the carrier.

It is also a specific object of the invention to provide an information carrier having resonant devices disposed in a predetermined pattern across its face and so arranged that a large number of such carriers can be produced that are initially identical but each of which can be subjected to a programmable modification whereby it is encoded with information distinctive to it.

A modified embodiment of the invention has as its object to further increase the large number of different items of information that can be encoded on an information carrier by using material that is magnetic as well as electrically conductive for some or all of those portions of a resonant device on the carrier that provide it with capacitance and by so arranging those portions of the device as to cooperate with other portions of it that define its coil or coils, to thereby influence the resonant frequency of the device.

These and other objects of the invention that will appear as the description proceeds are achieved in the information carrier of this invention, which comprises a card or the like having thereon a plurality of resonant devices spaced from one another in a predetermined pattern across the face of the carrier, each said device having inductance and capacitance and being tuned to a predetermined resonant frequency for producing a detectable response to irradiation of the carrier by an electromagnetic wave of that frequency. Each such resonant device comprises a dielectric sheet and a pair of deposits of electrically conductive material, one overlying each surface of that sheet to provide capacitance, at least one of said deposits having therein a narrow, elongated and substantially spiral slit defining in it a substantially spiral coil that provides inductance. The information carrier of this invention is characterized in that for each of its resonant devices each said deposit of electrically conductive material has a capacitance region which opposes a like capacitance region of the other deposit and which extends uninterruptedly through substantial distances in a direction along said slit and in another direction away from said slit so that the resonant frequency of the device can be raised by punching a hole through the carrier at a location to remove like portions of said opposing capacitance regions of said deposits to thus reduce their areas.

Other characterizing features of the invention, and particularly of certain of its embodiments, will appear as the description proceeds.

BRIEF DESCRIPTION OF DRAWINGS

In the accompanying drawings, which illustrate what are now regarded as preferred embodiments of the invention.

DETAILED DESCRIPTION OF PREFERRED EMBODIMENTS OF THE INVENTION

Figure 1:
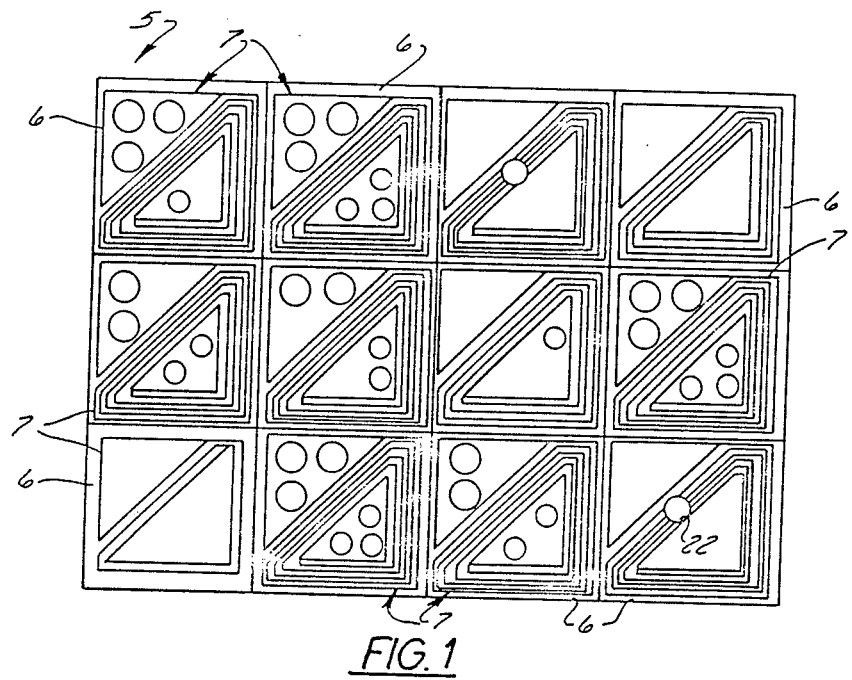
FIG. 1 is a plan view of an information carrier embodying the principles of this invention.

An information carrier 5 that embodies the principles of this invention comprises a card, tag, label or the like that is preferably of laminated construction. Across its face the carrier is divided into a plurality of zones 6 that are all of uniform shape, preferably square. In every such zone 6 there is located a resonant device 7 of this invention. Each resonant device is preferably tuned to a resonant frequency different from that of all of the others, to provide for encoding any of a large number of different information items; but two or more resonant devices that are spaced at substantial distances from one another across the face of the carrier could be tuned to the same resonant frequency, especially in a case where the reading apparatus (not shown) with which the carrier is intended to cooperate can discriminate between only a limited number of different frequencies. Since each zone 6 of the carrier constitutes an information bit, the absence of a resonant frequency in a given zone can constitute a useful form of such a bit; and conceivably, therefore, resonant devices could be omitted from one or a few of the zones 6, with a corresponding decrease in the variety of items of information available for encoding on the carrier. However, the minuscule production economy to be gained by such omission of resonant devices would seldom be worthwhile, especially since the invention, as explained hereinafter, makes it possible to disable any selected one of the resonant devices with very little trouble or effort.

Each resonant device 7 comprises a sheet 8 of dielectric material that has a deposit 9, 10 of electrically conductive material overlying each of its opposite surfaces. The dielectric sheet 8 is preferably coextensive with the carrier 5 and thus extends across all of the zones 6 to be common to all of the resonant devices 7 on the carrier. Each of the deposits 9, 10 can be imprinted on the dielectric sheet 8 or can be in the form of a metal foil or electrically conductive film that flatwise overlies the dielectric sheet and is bonded to it. It will be understood that the dielectric sheet 8 can comprise a central lamination of the carrier and that the carrier will normally comprise other laminations 11 which flatwise overlie each surface of the dielectric sheet 8 and the deposits 9, 10 thereon to protect that sheet and the deposits.

Each of the deposits 9, 10 that cooperate to comprise a resonant device 7 is confined within its own zone 6 of the carrier to be geometrically spaced and electrically insulated from the deposits that comprise all of the other resonant devices.

In at least one of the two deposits 9, 10 that comprise each resonant device there is a narrow, elongated, substantially spiral slit 12 which defines in the deposit a spiral coil 14 that provides the device with inductance. Each of the deposits 9, 10 also has at least one capacitance region 16 which is of substantial area to constitute a condenser plate and which is opposite a like region of the other deposit 10, 9 to cooperate therewith in providing the device with capacitance.

Figure 2:
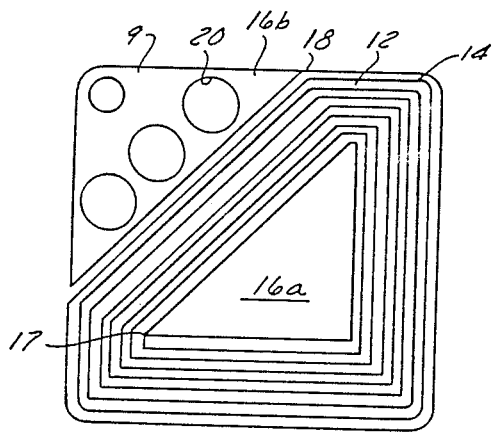
FIG. 2 is a plan view, on an enlarged scale, of the obverse side of one of the resonant devices on the information carrier.
Figure 3:
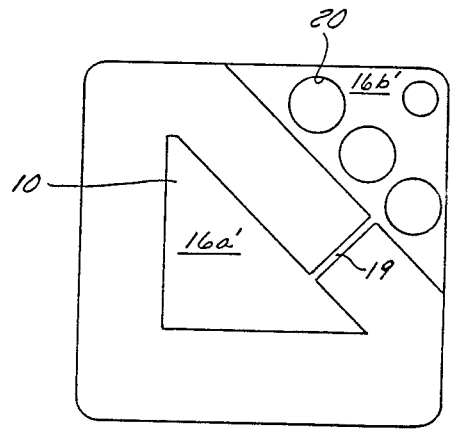
FIG. 3 shows the reverse side of the device shown in Fig. 2.
Figure 10:
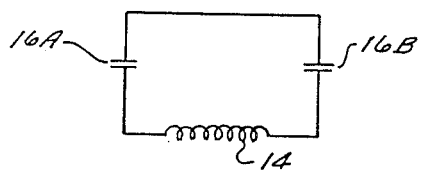
FIGS. 10 and 11 are equivalent circuit diagrams for the resonant devices.

In the embodiment of the invention that is illustrated by FIGS. 2 and 3, the slit 12 is formed in the deposit 9 that overlies a surface of the dielectric sheet 8 which is hereinafter designated its obverse side. The deposit 9 also has two capacitance regions 16a and 16b, one of which 16a is surrounded by the coil 14. The coil has its inner end connected at 17 to the capacitance region 16a that it surrounds and has its outer end connected at 18 to the other capacitance region 16b. The deposit 10 on the opposite or reverse surface of the insulating sheet 8 has two capacitance regions 16a' and 16b' which respectively oppose the capacitance regions 16a and 16b on the obverse side and are electrically connected by a strip-like conductor portion 19 of the deposit 10 that extends between them. Each of the capacitance regions 16a', 16b' is substantially identical in shape and size to its opposing capacitance region 16a, 16b. It will be apparent that each opposing pair of capacitance regions 16a, 16a' and 16b, 16b' constitutes a condenser, and that the two condensers 16A and 16B thus constituted are connected with the coil 14 in the circuit represented by FIG. 10.

In accordance with a characterizing feature of this invention, each of the capacitance regions 16a, 16b of the obverse side deposit 9 has substantial extension in a direction along the spiral slit 12 and also in a direction away from that slit. Therefore it is an easy matter to select a location at which a hole 20 punched through the carrier will be spaced from all portions of the coil 14 but will reduce the area of a capacitance region 16a or 16b and of its opposing capacitance region 16a' or 16b'. Thus the capacitance of the device can be reduced to any predetermined extent, to correspondingly raise its resonant frequency to a predetermined value, by simply punching a hole or holes through the carrier that are of suitable size and suitable in number. It will be apparent that an outer lamination 11 of the carrier can be marked with indicia designating locations at which a hole or holes can be punched in it that will reduce the area of capacitance regions to a predetermined extent for retuning each resonant device to a predetermined resonant frequency. It will also be apparent that retuning of each resonant device on an information carrier of this invention can be carried out by programmable automatic apparatus.

Because the several turns of the coil 14 lie closely adjacent to one another, the resonant device can be rendered inoperative by punching an appropriately shaped hole 22 through the carrier at a location to cut through every turn of the coil. If the device thereafter remains resonant, its resonant frequency will nevertheless be so drastically changed as to be outside the frequency spectrum of the reading apparatus with which the carrier cooperates.

A obvious modification of the above described embodiment of the device is to configure the deposit 10 on the reverse side of the dielectric sheet 8 to be substantially identical to that on the obverse side. The conductor strip 19 would thus be replaced by a second coil to provide the device with higher inductance.

Figure 4:
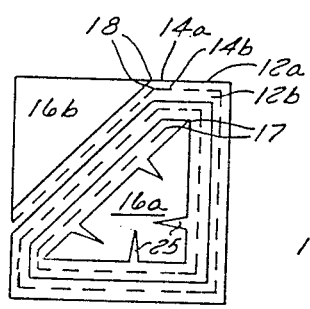
FIG. 4 is a view similar to FIG. 2 but showing a modified form of the resonant device.

FIG. 4 illustrates a further modified form of the resonant device wherein the deposit 9 on the obverse side of the dielectric sheet 8 has two slits 12a and 12b therein to define two coils 14a (shown by a full line) and 14b (shown by a broken line) that are interwound with one another and provide a higher inductance than is available with a single coil. Each coil 14a, 14b has its inner end connected (at 17) to a capacitance region 16a that the coils surround and has its outer end connected (at 18) to another capacitance region 16b. The two coils 14a, 14b are thus connected in parallel in a circuit which is in other respects like that of FIG. 10. The deposit 10 on the reverse side of the dielectric sheet 8 can have substantially the configuration illustrated in FIG. 3 or can be a mirror image of that shown in FIG. 4. To further increase the inductance of the device, one or both of the deposits 9, 10 can be of a material that is magnetically permeable as well as electrically conductive. To prevent eddy currents in the capacitance regions 16a, 16b, slots 25 extend outwardly in them from near their centers that are narrow enough to have little effect upon capacitance while increasing Q-value. The resonant frequency of the device illustrated in FIG. 4 can be retuned as described above.

Figure 5:
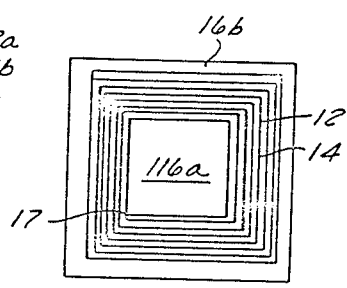
FIGS. 5 and 6 illustrate another modified form of the resonant device, FIG. 5 showing its obverse side and FIG. 6 its reverse side.
Figure 6:
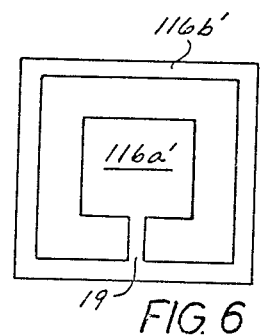
Figure 13:
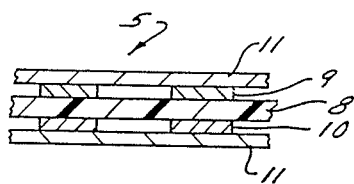
FIG. 13 is a view of the information carrier in cross-section, with thicknesses exaggerated.

In the above described embodiments of the invention, the capacitance regions that correspond to condenser plates are triangular. FIGS. 5 and 6 illustrate a further modified embodiment of the invention. In this case the deposit 9 on the obverse side of the dielectric sheet has a first square or rectangular capacitance region 116a that is surrounded by a coil 14 defined by a slit 12, and the coil is in turn surrounded by a border-like or frame-like second capacitance region 116b in the form of a relatively broad stripe that extends continuously around the margin of the zone in which the device is located. The reverse-side deposit 10 has capacitance regions 116a' and 116b' which respectively oppose the capacitance regions 116a and 116b and are respectively similar to them in shape and size. The reverse-side deposit also comprises a stripe-like conductor 19 that electrically connects the capacitance regions 116a', 116b', to provide a resonant circuit like that illustrated in FIG. 10. The capacitance regions 116a, 116b embody the characterizing feature of the invention in that each opposes a like capacitance region 116a', 116b' and has substantial extension in a direction along the slit 12 and in another direction away from that slit. It is therefore possible, by punching through the carrier, to reduce the area, and hence the capacitance, of each pair 116a, 116a' and 116b, 116b' of opposed condenser plates by a predetermined amount and correspondingly raise the resonant frequency of the device to a predetermined value.

Figure 7:
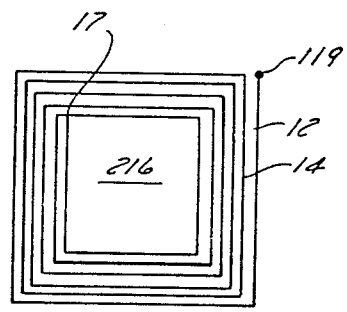
FIGS. 7, 8 and 9 show other modified embodiments of the resonant circuit.

FIG. 7 illustrates a further modified embodiment of the invention wherein the deposits 9, 10 on opposite surfaces of the dielectric sheet are mirror images of one another, each having a central square capacitance region 216 surrounded by a coil 14 that is defined by a slit 12 in the deposit. The coil provided by each deposit has its inner end connected as at 17 to the capacitance region that it surrounds and has at its outer end a connection 119 that is electrically bonded through the dielectric sheet 8 to the outer end of the coil of the other deposit. The coils defined by the two deposits are thus connected in series with one another in a circuit represented by FIG. 11. The above described characteristic feature of the invention will be recognized in this embodiment, and hence it can be readily and accurately retuned by punching a hole or holes through the carrier to reduce the areas of the opposing capacitance regions.

Figure 8:
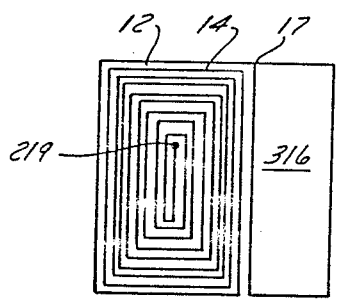

FIG. 8 depicts a modification of the last described embodiment, wherein the deposits 9, 10 on the dielectric sheet 8 are mirror images of one another and wherein the coils on the opposite surfaces of that sheet are connected to one another through it. In this case the coil 14 of each deposit 9, 10—again defined by a slit 12 in the deposit—is laterally adjacent to a capacitance region 316 of its deposit. The coil has its outer end connected at 17 to its adjacent capacitance region and has its inner end connected at 219 with the inner end of the other coil.

Figure 11:
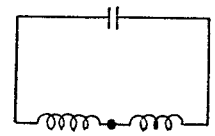

The two last described embodiments have the advantage of providing coils connected in series with one another and a condenser in a circuit represented by FIG. 11 that provides both high inductance and high capacitance in a relatively small area of the carrier. However, the connection through the dielectric sheet presents a risk of breakage.

Figure 9:
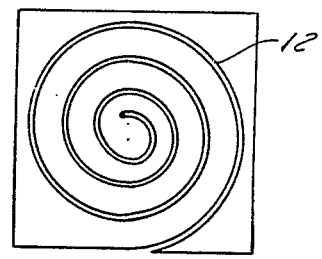

FIG. 9 depicts another embodiment of the invention wherein the deposit 9, 10 on each surface of the dielectric sheet is a mirror image of the deposit 10, 9 on the other surface. In this case each deposit 9, 10 is generally square in outline and is interrupted only by the spiral slit 12 whereby the deposit as a whole is caused to constitute a spiral winding and also a capacitance region. In effect, the coils have such a high self-capacitance that no separate condenser as such is needed, although it will be seen that the deposits have capacitance regions in accordance with the characterizing feature of the invention, most notably in their corner areas, where holes for capacitance reduction would preferably be punched.

Figure 12:
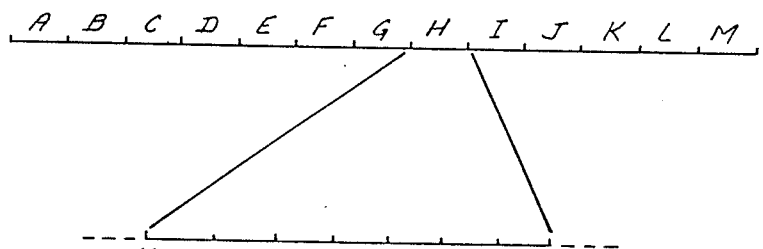
FIG. 12 is a diagram explaining possible frequency combinations to which an information carrier of this invention can be tuned and retuned.

FIG. 12 schematically depicts a frequency scale for the resonance devices of an information carrier of this invention. The several resonant devices have the respective resonant frequency ranges A, B, C . . . L (upper diagram). As initially made their resonant frequencies differ by increments that are relatively large and are preferably substantially uniform. The lower diagram represents at $H_o$ the initial resonant frequency of the device having the H range, which can be retuned, as described above, to any selected one of a number of higher frequencies $H_1, H_2 \ldots H_6$. The retuned frequencies differ from the initial frequency and one another by relatively small increments such that the frequency of a retuned device will not overlap that of any other device. In addition, each device can be rendered non-resonant by punching through its coil as explained above. In the example illustrated, each of the 12 resonant devices can have any one of 8 frequency alternatives so that, in total, almost 64 billion combinations are possible.

From the foregoing description taken with the accompanying drawings, it will be apparent that this invention provides an information carrier capable of being produced at low cost because all such carriers can be initially made with identical resonant devices and each such carrier can be quickly and accurately modified to retune each of its resonant devices to any selected one of a number of higher frequencies, or to be non-resonant to provide for encoding on the carrier any of a very large number of different items of information.

What is claimed as the invention is:

1. An information carrier comprising a card or the like having thereon a plurality of resonant devices spaced from one another in a predetermined pattern across the face of the carrier, each said device having inductance and capacitance and being tuned to a predetermined resonant frequency for producing a detectable response to irradiation of the carrier by an electromagnetic wave of that frequency, each said resonant device comprising a dielectric sheet and a pair of deposits of electrically conductive material, one overlying each surface of said sheet to provide capacitance, at least one of said deposits having therein a narrow, elongated and substantially spiral slit defining in it a substantially spiral coil that provides inductance, said device being characterized in that, for each said resonant device:

each said deposit has a capacitance region
   (1) which opposes a like capacitance region of the other deposit and
   (2) which extends unbrokenly through substantial distances in a direction along said slit and another direction away from said slit so that the resonant frequency of the device can be raised by punching a hole through the carrier at a location to remove like portions of said opposing capacitance regions of said deposits to thus reduce their areas.

2. The identification device of claim 1, further characterized in that one of said deposits is of a material that is magnetically permeable as well as electrically conductive.

3. The identification device of claim 1 further characterized in that said slit is so arranged that the coil defined thereby has a zone wherein a portion of each turn of that coil is closely adjacent to a portion of every other turn thereof, so that every turn of said coil can be opened by punching a hole through the carrier in said zone.

4. The identification device of claim 1, further characterized in that, for each said resonant device:
   (1) each said deposit has a second capacitance region which opposes the second capacitance region of the other deposit and is similar to it in shape and size;
   (2) the coil defined in said one deposit by said slit
      (a) surrounds one of said capacitance regions of that deposit and has an inner end continuous with that capacitance region, and
      (b) has an outer end continuous with the other capacitance region of said one deposit; and
   )3) the other of said deposits has its capacitance regions connected by a strip-like portion of that other deposit which has opposite ends continuous with those capacitance regions.

* * * * *